United States Patent [19]

Zemlin et al.

[11] 4,070,224

[45] Jan. 24, 1978

[54] POLYMER BACKED SILICONE RUBBER MOLDS AND MEANS FOR FORMING BONDS WITH POLYORGANOSILOXANES

[75] Inventors: John C. Zemlin, Reading; Robert Davis, Concord, both of Mass.

[73] Assignee: Allied Resin Corporation, East Weymouth, Mass.

[21] Appl. No.: 706,784

[22] Filed: July 19, 1976

Related U.S. Application Data

[63] Continuation of Ser. No. 456,831, April 1, 1974, abandoned.

[51] Int. Cl.$^2$ .............................................. B32B 31/12
[52] U.S. Cl. ..................................... 156/314; 156/246; 156/329; 427/302; 428/420; 428/423; 428/447
[58] Field of Search ............... 425/440, 803, DIG. 44; 249/134; 260/448.2 R, 448.2 B, 429, 447; 428/423, 414, 424, 415, 416, 425, 426, 447, 420; 156/242, 308, 246, 314, 329, 326, 246; 427/301, 302, 333, 400, 407 C

[56] References Cited

U.S. PATENT DOCUMENTS

| | | | |
|---|---|---|---|
| 3,321,350 | 5/1967 | Fekete | 156/329 |
| 3,539,144 | 11/1970 | Krug | 249/134 |
| 3,794,556 | 2/1974 | Young | 428/413 |

Primary Examiner—George F. Lesmes
Assistant Examiner—Stanley S. Silverman
Attorney, Agent, or Firm—Wolf, Greenfield & Sacks

[57] ABSTRACT

A mold has a silicone rubber body defining a molding cavity with a polymeric backer forming a support for the body integrally joined to the body by an adhesive bond. A cured silicone rubber or silicone resin is bonded to anyone of a variety of polymeric substances by applying an activating primer such as trimethylbenzyl ammonium hydroxide and subsequently or simultaneously applying a bridging agent which bonds to the activated silicone surface and also provides bonding sites for later attachment to polymers containing isocyanates, epoxides and/or other reactive groups.

5 Claims, 1 Drawing Figure

POLYMER BACKED SILICONE RUBBER MOLDS AND MEANS FOR FORMING BONDS WITH POLYORGANOSILOXANES

RELATED APPLICATION

This application is a continuation of application Ser. No. 456,831 filed Apr. 1, 1974, now abandoned.

BACKGROUND OF THE INVENTION

Silicone rubbers are often used as mold forming materials for molding a variety of cast articles of plastics including polyesters, polystyrene, rigid urethane foams, epoxy resins and others. Silicone rubber molds have excellent inherent release properties so that cast articles can be readily removed from the mold. The silicone rubbers can be flexed and stretched so that articles with mold undercuts can be easily removed from the molds. However, such molds must be flexed and stretched very gently or mold tearing occurs since tensile strength of silicone rubbers is normally low. Moreover, silicone rubber materials are comparatively expensive resulting in expensive molds.

Silicone rubbers and silicone resins are widely used commercially for a wide variety of purposes including electric insulation, sealing means, coating applications and the like in addition to use as mold materials. In such applications it is often desirable to bond the silicone rubber to other materials in order to increase tensile strength or to otherwise protect the silicone materials. However, this has been difficult in the prior art. Bonding methods are known for bonding silicone rubber and silicone resins to other polymers as when the silicones are cast onto polymeric surfaces and then cured in place. However, no commonly acepted methods are well-known for forming effective bonds when bonding silicone rubber and silicone resins which have already been cured, to other polymeric materials. This is true even though effective bonding means have been developed for bonding cured siloxane resin surfaces to other cured siloxane resin surfaces as disclosed in U.S. Pat. No. 3,698,982 issued Oct. 17, 1972.

SUMMARY OF THE INVENTION

It is an object of this invention to provide a mold having a silicone rubber mold body with a polymeric backer of another organic material, which is highly useful in the molding art.

It is another object of this invention to provide a mold in accordance with the preceding object which has improved effective tear strength over homogeneous silicone rubber molds.

It is still another object of this invention to provide a silicone rubber mold in accordance with the preceding objects which is comparatively low in cost as compared with homogeneously formed silicone rubber molds.

Still another object of this invention is to provide a means and method for adhering various polymers including elastomers and others to previously cured silicone rubbers and silicone resins.

According to the invention a mold comprises a silicone rubber body defining a molding cavity. A polymeric backer is bonded to the body by an adhesive bond. A second backer can be bonded to the first-mentioned backer.

The bond is formed by an activating primer agent which functions to disrupt siloxane linkages in the silicone rubber and a bridging agent which bonds with disrupted siloxane and leaves a residue reactive group which is in turn capable of bonding to a polymeric backer not containing siloxanes. In some cases, the activating primer agent and the bridging agent can be a single material.

The polymeric backer can itself be used as an adhesive layer to bond to a second backer of other materials such as wood, ceramics, organic polymeric materials or metals.

According to the method of this invention, a cured silicone rubber or resin surface is treated with an activating primer agent which is a base capable of breaking siloxane bonds. Simultaneously or shortly thereafter, the surface is treated with a bridging agent consisting of a di or polyfunctional compound capable of reacting with silanol groups and which also has substituents such that active hydrogens or other reactive groups such as epoxides, aziridines and isocyanates are available after reaction with the silanol for bonding with a backer polymeric material. A polymeric material other than a silicone rubber or resin can then be cast on the surface and formed or cured directly thereon reacting with such reactive groups and acting as a backer. Alternately the polymeric material can be applied as a thin layer and itself act as an adhesive to bond to other materials which form a backer. Such other materials include ceramics, glass, woods, metal and previously cured polymeric materials in sheet or other shapes which will adhere to the polymeric material layer.

It is a feature of this invention that composite silicone rubber molds formed have good tear resistance and decreased cost since less expensive material is substituted for part of the molds that would otherwise be silicone rubber materials.

Still another feature of the invention resides in the capability of bonding various polymeric materials to silicone rubbers and silicone resins which have already been cured, while forming bonds having extremely high adhesion values in a manner not hithertofore possible. Such polymeric materials can form a backer or can act as an adhesive or intermediate layer to bond other materials which form a second backer for the silicone rubber or silicone resin. Thus plural layered devices having organosiloxanes bonded to other polymeric materials alone or with other backers, to increase tensile strength of the organosiloxanes, protect them or otherwise enhance their properties are possible in a variety of applications.

BRIEF DESCRIPTION OF THE DRAWINGS

The above and other features, objects and advantages of the present invention will be better understood from a reading of the following specification in conjunction with the accompanying drawings in which.

DESCRIPTION OF PREFERRED EMBODIMENTS

Figure 1:
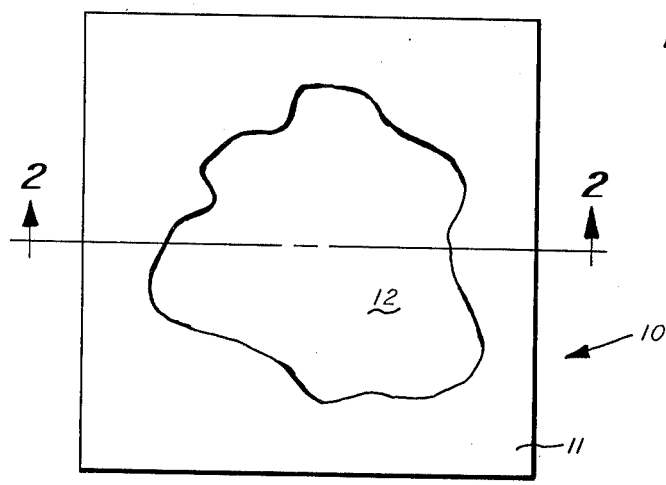
FIG. 1 is a top plan view of a composite mold in accordance with this invention.
Figure 2:
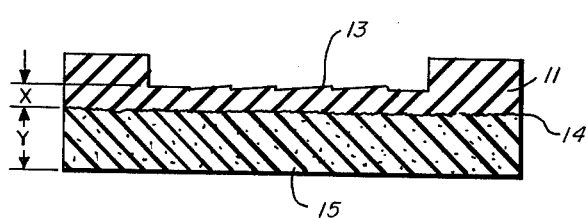
FIG. 2 is a cross sectional view thereof taken through line 2—2 of FIG. 1.

With reference now to the drawings and more particularly FIGS. 1 and 2, a preferred embodiment of a silicone rubber mold having an integrally joined backer of a rubbery polymeric material is illustrated generally at 10 in FIG. 1. The mold 10 has a silicone rubber body 11 defining a mold cavity 12 with a raised portion 13 which defines a surface configuration. A bonding joint 14 is formed over the planar rear surface of the body and firmly bonds a polymeric backer sheet 15 of a rubbery material to form the composite mold.

The mold 10 is designed for forming epoxy flow molding molds. In use, the epoxy material is poured into the molding cavity 12 and allowed to harden and cure therein. As known in the art, the mold 10 is then stripped from the hardened epoxy mold thus formed and reused. Ordinarily, the entire mold 10 is formed of silicone rubber. In accordance with this invention, the body portion 11 has a thickness X of 1/16 inch with a backer thickness Y of ¼ inch. The thickness Y of the sheet 15 provides good tensile strength to the mold 10 and in addition greatly reduces the cost over that otherwise incurred if the entire mold is formed of silicone rubber. The bond 14 will be more fully described below along with the materials of the sheet 15.

Any of the known silicone rubbers and silicone resins in their cured form can be bonded to polymeric materials in accordance with the present invention. Such silicone rubbers and silicone resins are essentially polydiorganosiloxanes that are cross-linked with organic peroxides or with polyfunctional silanes and siloxanes using metal catalysts. One part silicones are usually polydiorganosiloxanes having acetoxy end groups which cure by moisture induced hydrolysis of the acetoxy groups followed by condensation of formed silanol groups. Many variations of the cross-linking steps are used to some extent in known silicone technology. The organosiloxanes are those in which the organic substituent can be any mono valent substituted or non-substituted hydrocarbon. The most common hydrocarbon is the methyl group although ethyl, octyl, cyclohexyl, phenyl, and vinyl radicals are typical of those normally used. substituted hydrocarbon radicals include any of the above with bromine, chlorine, fluorine, cyano groups, esters or the like replacing some or all of the hydrocarbon hydrogens. Preferably the silicone rubbers and silicone resins which are bonded by the process of this invention are predominantly dimethyl silicones or methyl phenyl siloxanes or mixtures of these.

The term "cured" as used in the specification and claims means that the silicone rubber or silicone resin has been converted to a solid, nontacky condition. In some cases, this occurs at some stage short of a full cure. Thus partial and fully cured silicone rubbers and silicone resins can be bonded in accordance with this invention so long as they are in a solid, nontacky condition.

In the bonding process of this invention, a cured silicone rubber or silicone resin surface is treated with an activating agent or primer which is a base. The activating agent functions to disrupt siloxane linkings in the silicone rubber forming free silanol groups. Simultaneously or shortly thereafter, the surface is treated with a bridging agent which reacts with the so disrupted siloxanes and leaves a residue reactive group which can in turn react with a dissimilar polymeric material used as a backer. Preferably the reactive group left has substituents containing active hydrogens or other reactive groups after reaction with a silanol.

The activating agents and bridging agents can be in fluid form at room temperature or can be used in a solvent solution. Solvent solutions often allow easier spreading or spraying of the agents with improved wetting and better stability (by excluding carbon dioxide from air, water vapor and the like). Suitable solvents are preferably volatile under conditions of use so that they do not interfere with the actions of the active agents. Particularly useful are solvents such as methylene chloride, perchloroethylene and halogenated hydrocarbon solvents generally. Others such as toluene, acetone, ethyl ether, nitromethane tetrahydrofuran and the like are also useful. Solvents with hydroxyl groups are generally not preferred. It is preferred that the solvents evaporate readily and not enter into the bonding reaction or react with the silicone rubber resin or the polymeric backer material.

The polymeric substances to be bonded to the silicone rubber or silicone resin can be any of the known polymeric materials which are preferably fluid or semi-fluid on application, before curing, polymerizing or drying, to the silicone surface and contain groups reactive with the residual groups from the bridging agent. Such groups in the polymeric material include isocyanates, epoxides, cyanoacrylates, aziridines, carboxyl, active hydrogens and the like. Epoxys and urethanes are preferred materials for bonding to silicone rubbers and silicone resins. The polymeric substances are chosen as desired to bond with the particular bridging agent used and to have the desired backing properties. The backer layer 15 can be elastomeric or rigid as desired for a particular use. These backer materials are preferably formed or cured directly on the silicone rubber or resin surface after treatment with the priming agent and bridging agent. The terms "polymeric material" and "polymeric substance" as used herein to describe the layer 15 which acts as a backer and/or adhesive for a second backer is meant to include prepolymeric materials and reactants which polymerize, cure or dry in position to form substantially polymerized sheets or other shapes in the final composite mold or other product.

In some cases, the bonding process can also be used to laminate cured silicone rubber sheet stock, silicone covered fabric or silicone based sheet products to a variety of backup or second backers formed of materials such as ceramics, glass, metal, wood and polymeric materials which are cured and previously formed into sheets. In these cases the preformed sheets or other shapes of the second backer material are preferably applied over the polymeric substance when forming the bonds of this invention so that the second backer (not shown) is bound to the polymeric substance such as 15 during the bonding method of this invention.

Castable urethane resins are preferred for use as the backer or adhesive layer in this invention. Typically such urethanes consist of an isocyanate terminated prepolymer which is mixed with slightly less than an equivalent amount of polyhydroxy or polyamine curative often with an organometallic or amine catalyst.

Typical epoxys which can be bound to the silicone materials of this invention consist of a mixture of diglycidylether of bisphenol A or of bis(3,4-epoxy-6-methyl cyclohexylmethyl) adipate with an approximately equivalent amount of an amine curative such as the amine terminated amide of dimerized linoleic acid and ethylene diamine. Other epoxy resins based on the above epoxides cured with aromatic amines, acid anhydrides, novolac resins and other combinations well-known in the art can be used.

Activating agents or primers are preferably alkaline materials such as those which have been found useful as catalysts in the polymerization of low molecular weight polyorganosiloxanes. For example, siloxane rearrangement catalysts of the type disclosed in U.S. Pat. No.

3,698,982 issued Oct. 17, 1972 can be used. Such activating agents include alkaline metal hydroxides such as calcium hydroxide, sodium hydroxide, potassium hydroxide, cesium hydroxide, alkali metal silanolates such as potassium dimethylsiliconate, alkali metal alkoxides such as potassium isopropylate, quaternary ammonium and phosphonium hydroxides such as tetramethylammoniumhydroxide, tetra-n-butylphosphoniumhydroxides, and benzyltrimethylammoniumhydroxide, silanolates and alkoxides of quaternary ammonium and phosphonium radicals, potassium amide, amines, preferably alkyl or cycloalkyl amines and the like.

The activating agents are preferably used at room temperature of 70° F or slightly above. However, the activating agents can be sprayed or otherwise coated on the cured polyorganosiloxane surface to be joined over a wide range of temperatures but preferably are used at from 65° F to 140° F. Preferably the activating agents are sprayed or applied as a fluid in a thin film over the surface to be treated. A thin film as close to a monomolecular layer as practical is preferably used since a large excess may interfere with bonding. Spraying the film to a thickness below that which causes run off and overflow around the edge of a horizontally positioned silicone surface is the preferred limit for the amount of activating agent used. The use of solvents for the bridging agent and activating agent can aid in obtaining thin uniform, continuous films. The activating agent is permitted to react with the cured organosiloxane surface for a time period which permits disruption of siloxane which time period may be from several seconds to 3 days or longer depending on the particular temperature and agent used. If a solvent is used, it is preferred to allow sufficient time for it to evaporate before proceeding with the bonding process.

Bridging agents useful in this invention are stable materials under the conditions of use, i.e. not internally reactive, which can be defined by the structure $X_n$-R-$Y_m$ where X and Y are any of the following:

Examples of such compounds are diols or polyols such as ethylene glycol, butylene glycol, trimethylolpropane, polypropylene glycols generally, tetraethoxyethylenediamine, and the like.

Compounds which generate hydroxyl groups on reaction with alkalies are also useful and include epoxy monomers such as the glycidyl ether of bis-phenol A, dicyclopentadienediepoxide, glycidol, and any difunctional or polyfunctional epoxy compound containing at least two epoxy groups or at least one hydroxy group and one epoxy group.

Another group of bridging materials are amino polyols containing at least one primary amine or unhindered secondary amine and at least one hydroxy group. To be unhindered the secondary amine must have one methyl group attached to the nitrogen, as in methylethanol amine; or the nitrogen must be part of a 5 or 6 membered ring, i.e. 4-ethanolpiperidine. Useful compounds are ethanolamine, isopropanolamine, and the like.

Mercapto alcohols such as 2-mercapto ethanol, 1-mercapto glycerol, and the like are also useful.

In some cases, the bridging agent can also act as the activating agent or primer. In a preferred embodiment, organo aminosiloxy compounds such as γ-aminopropyltrimethoxy silane, γ-aminopropyltriethoxy silane, and N-β-(aminoethyl)-γ-aminopropyltrimethoxy silane are useful. These are quite unique because they seem to act both as bridging agent and, presumably owing to their strong basicity, as activating agents or primers.

Also useful are organomercapto and organoepoxysiloxy compounds such as γ-mercaptopropyltrimethoxy silane, γ-glycidoxypropyltrimethoxy silane, γ-(3,4-epoxycyclohexyl)-ethyltrimethoxy silane, and γ-isocyanate propyltriethoxy silane.

The bridging agent can be applied over the activating agent treated surface in the same manner as application of the activating agent and allowed to react under the same conditions as described above with regard to the activating agent.

| | X | Y | |
|---|---|---|---|
| hydroxyl | —OH | —OH | hydroxyl |
| diorganosilanol | R<br>\|<br>—Si—OH<br>\|<br>R | —SH<br>NH$_2$ | mercaptan<br>primary amine |
| diorgano alkoxy silane | R<br>\|<br>—Si—OR(R')<br>\|<br>R | —N(CH$_3$)(H) | secondary amine |
| mono organo dialkoxy silane | R<br>\|<br>—Si—OR(R')<br>\|<br>OR(R') | —R⟨△⟩NH | alicyclic amine |
| trialkoxy silane | —Si(OR)$_3$ | —C(R(H))(O)—C=R$_2$(H$_2$) | epoxide |
| epoxide | —C(R(H))(O)—C=R$_2$(H) | —C(R(H))(NH)—CR$_2$(H$_2$) | aziridine |
| mercaptan | —SH | —NCO | isocyanate | and —R— is any organic group having a molecular weight below 1000 and not containing reactive, acidic groups; that is, groups which would neutralize the activating primer.

n and m are integers from 1 to 12.

Preferably the bridging agent and activating agent are mixed together and applied over the cured organopolysiloxane surface in a single step since they do not interfere with each other and both reactions take place substantially at the same time under the same reaction conditions.

When dual functional agents are used, a single spray or coating step is employed to prepare the cured silicone rubber or silicone resin surface for bonding to the polymeric materials to form composite materials.

Preferably the polymeric materials are cast directly over the surface carrying the bridging agent and activating agent and polymerized in place.

When the polymeric materials of the layer such as 15 are to be used only as adhesive, thin layers may be spread over the silicone rubber or silicone resin treated surface of this invention and applied directly to the second backer material. For example layers of from 1/64 inch to ¼ inch or more of the polymeric material can be used as adhesives. Completion of the bond is then carried out in accordance with the particular adhesive polymeric material used as known in the art.

The curing or drying of the polymeric material used for the layer 15 be it as the sole backer, or as an adhesive for the second backer, is carried out in accordance with known parameters of time and temperature for curing the material to polymeric compositions desired. Temperatures and times for cures may vary over wide ranges as for example a curing time of from 10 seconds to 2 weeks and a curing temperature of from 20° F to 400° F. Preferably polymeric materials for the layer 15 are those which will polymerize at room temperature since the use of room temperature is more convenient than elevated or depressed temperatures.

The following examples are illustrative of the invention and indicate the high adhesion values obtained in bonds to cured silicone rubber and silicone resins following the procedures of this invention as compared to Examples 1 and 2 where no activating or bridging agent is used.

EXAMPLE 1

Sheets of silicone rubber were prepared from three commercial "room temperature vulcanizing" compounds. These are General Electric RTV-664, RTV-8112, and RTV-700 produced by General Electric Company Silicone Products Dept., Plastics Division of Waterford, New York. RTV-664 is an addition curing compound in which silane curatives add to vinyl unsaturation in a polysiloxane. RTV-8112 and RTV-700 are condensation curing compounds in which an alkoxy silane condenses with an organosiloxy diol in the presence of a metallic catalyst.

The compounds were mixed and cast in approximately 1/8 inch thick layers on Teflon coated aluminum sheets on which coarse woven fiberglass scrim had been spread. The cast composites were then cured overnight at 60° C. The fiberglass scrim was used to increase the tear strength of the silicones during subsequent adhesion tests.

The silicone composite sheets were cut up into 1 × 6 inch strips and placed, fiberglass side down, into 1 × 6 × ¼ inch metal molds. A commercial polyurethane casting rubber, Conap TU-60 produced by Conap Incorporated of Allegheny, New York consisting essentially of polypropylene glycol, toluene diisocyanate, aromatic diamine based system, was then mixed and poured over the individual silicone strips to form a ¼ inch thick layer. After overnight room temperature curing, the urethane layer was pulled away from the silicone alyer in a Dillon tensile tester using a jaw separation speed of 10 inches per minute. The maximum adhesion values in pounds per inch width of joint was as follows:

| Silicone | Adhesion Value |
|---|---|
| RTV-664 | Less than 0.1 pi (lowest sensitivity of tester) |
| RTV-8112 | Less than 0.1 pi (lowest sensitivity of tester) |
| RTV-700 | Less than 0.1 pi (lowest sensitivity of tester) |

EXAMPLE 2

Example 1 was repeated except that the following two-part urethanes were used in place of the TU-60:
Polyester-MDI-amine cured urethane — Shore A-50
Polyester-MDI-amine cured urethane — Shore A-90
In all cases the adhesion was found to be less than 0.1 pi.

EXAMPLE 3

The procedure of Example 1 was repeated except that the following solutions were sprayed lightly over the silicone surface and let stand for 24 hours. Then the Shore A-50 polyester urethane from Example 2 was used in place of the TU-60.

| Silicone | Spray Solution | Adhesion Value lbs/in |
|---|---|---|
| RTV-664 | 4% benzyltrimethylammonium hydroxide (BTMAH) in β-(3,4-epoxycyclohexyl)-ethyltriethoxy silane. | 1.2 pi |
| RTV-700 | | 1.5 |
| RTV-664 | 4% BTMAH in γ-glycidoxypropyl-trimethoxy silane. | 3.0 |
| RTV-8112 | | 0.4 |
| RTV-700 | | 2.0 |
| RTV-664 | 4% tetrabutylphosphonium hydroxide in γ-aminopropyltri-ethoxy silane. | 12.4 |
| RTV-8112 | | 1.2 |
| RTV-700 | | 2.7 |

The bonds obtained through the use of the activating primer and bridging agent are obvious.

EXAMPLE 4

The procedure of Example 3 was repeated to evaluate the effects of the activating primer and the bridging agent individually as follows:

| Silicone | Spray Solution | Adhesion Value lbs/in |
|---|---|---|
| RTV-664 | 4% BTMAH in methylene chloride. | less than 0.1 |
| RTV-8112 | | less than 0.1 |
| RTV-700 | | less than 0.1 |
| RTV-664 | 4% tetrabutyl phosphonium hydroxide in methylene chloride. | less than 0.1 |
| RTV-700 | | less than 0.1 |
| RTV-664 | γ-glycidoxypropyltri-methoxy silane. | less than 0.1 |
| RTV-700 | | less than o.1 |
| RTV-664 | γ-aminopropyltriethoxy silane. | 3.0 |
| RTV-8112 | | 1.5 |
| RTV-700 | | 2.5 |

This illustrates the necessity of both activation and bridging in the treatment solution. That is, alkalinity alone or bridging without alkalinity do not provide bonding. Where both functions are combined in the same molecule as in γ-aminopropyltriethoxy silane good bonds are obtained.

EXAMPLE 5

Using the same procedure as Example 4 the following amino silanes were used as combined activation primers and bridging agents:

N-(β-aminoethyl)-γ-aminopropyltrimethoxy silane.
δ-amino-n-butyldiethoxymethyl silane.
δ-amino-n-butyltriethoxy silane.
N-(β-aminoethyl)-γ-aminopropyltriethoxy silane.

In each case, peel strengths of over one pound/inch were obtained.

EXAMPLE 6

A 2000 centistoke viscosity α,δ-dihydroxy polydimethyl siloxane, prepared by the equilibration of hydrated dimethyl dichlorosilane in the presence of acid-activated fullers earth, is mixed with 10% by weight of flame process $SiO_2$ and with 100% by weight of 325 mesh ground quartz. 100 gms of this mixture is then blended with 2 gm of tetraethyl silicate and 0.5 gm of dibutyltindilaurate after which it is cast over a 12 inch by 12 inch engraved plaque and permitted to cure for 3 days at room temperature.

A solution of 5 parts benzyltrimethyl ammonium hydroxide, 20 parts of the diglycidyl ether of bisphenol A, and 10 parts of the adduct of dimerized linoleic acid and ethylene diamine (having an amine value 230 mgKOH/gm), and 65 parts of methylene chloride was brushed lightly over the then cured silicone surface. After 30 minutes at room temperature, a 2/1 mixture of the above diglycidyl ether of bisphenol A with the above ethylene diamine adduct of dimerized linoleic acid was spread over the treated silicone surface to a depth of ¼ inch. This assembly was then cured overnight at 60° C. The resulting epoxy backed silicone mold was then used many times to reproduce the original plaque with essentially no warpage or distortion by repeatedly casting and demolding a commercial polyester-styrene casting compound.

EXAMPLE 7

A mold for use in the production of simulated brick wall sections was prepared by pouring a ⅛ inch thick layer of General Electric RTV-700 silicone over a horizontal master consisting of actual bricks mortared together to form 16 × 32 inches section. The silicone was allowed to cure for 3 days at room temperature after which a solution of 4% by weight trimethylbenzylammonium hydroxide and 20% by weight γ-aminopropyltrimethoxysilane in methylene chloride was sprayed over the cured silicone. After standing at 65° C overnight, a 1 inch thick layer of the Shore A-50 polyester urethane of Example 2 was poured over the treated silicone surface. The combination was again kept overnight at 65° C and on the next day was peeled away from the brick master. The resulting composite mold of silicone and urethane performed equally as well as a mold made solely of silicone in releasing simulated bricks of filled styrene-polyester composition. However, the silicone-urethane mold was able to resist better the extensive stretching needed to release the brick sections and thus its useful life was three times that of the pure silicone mold.

EXAMPLE 8

Inch thick silicone rubber sheet stock obtained from a commercial rubber supply house was cut into 1 × 2 foot rectangles. Each sheet was washed with tetrachloroethylene to remove any surface contamination and then sprayed on one side with a solution of 2% tetrabutylphosphoniumhydroxide and 10% γ-aminopropyltriethoxysilane in tetrachloroethylene. Following this operation, a 1/64 inch thick layer of freshly mixed Arcon E-154, a commercial two-part epoxy adhesive produced by Allied Resin Corporation of Weymouth, Massachusetts, was spread in a thin film over previously cleaned 1 × 2 foot steel plates from a conveyor system. The epoxy coated side of the steel plates was then laid on the treated surface of the silicone and the combined pieces held together for 24 hours in a 60° C oven. The resulting silicone-steel laminate was found to be so securely bonded to the steel that silicone rubber stock failure was obtained before the silicone and the steel could be separated.

EXAMPLE 9

Silicone rubber sheets of RTV-700 and RTV-664 were prepared according to the procedure of Example 1. After curing overnight as in Example 1, they were sprayed with the following solutions. Then after curing overnight at 65° C, the polyester urethane of Example 3 was spread over the treated silicone and allowed to cure overnight at room temperature to form ¼ inch thick layers. Peel tests on the silicone to urethane bond were run one week later in a Dillon tester. The results were as follows:

| Silicone | Treatment Solution Activating Primer- % By weight | Bridgeing agent - % by weight | Solvent | Adhesion Value lbs/in |
|---|---|---|---|---|
| RTV-664 | A 4 | 1 | 21 | Methylene | 9.0 |
| RTV-700 | A 4 | 1 | 20 | " | 4.5 |
| RTV-664 | A 4 | 2 | 10 | " | 1.9 |
| RTV-700 | A 4 | 2 | 16 | " | 3.0 |
| RTV-664 | A 4 | 3 | 10 | " | <0.1 |
| RTV-700 | A 4 | 3 | 10 | " | <0.1 |
| RTV-664 | A 4 | 4 | 10 | " | <0.1 |
| RTV-700 | A 4 | 4 | 10 | " | <8.1 |
| RTV-664 | A 4 | 5 | 10 | " | 4.5 |
| RTV-700 | A 4 | 5 | 10 | " | 2.5 |
| RTV-664 | A 4 | 6 | 10 | " | 2.5 |
| RTV-700 | A 4 | 6 | 10 | " | 2.8 |
| RTV-664 | A 4 | 7 | 6 | " | 1.5 |
| RTV-700 | A 4 | 7 | 5 | " | 1.3 |
| RTV-664 | A 4 | 8 | 5 | " | 1.1 |
| RTV-700 | A 4 | 8 | 5 | " | 1.6 |
| RTV-664 | A 4 | 9 | 5 | " | 1.6 |
| RTV-700 | A 4 | 9 | 5 | " | 2.4 |
| RTV-664 | A 4 | 10 | 10 | " | 3.6 |
| RTV-700 | A 4 | 10 | 10 | " | 4.5 |
| RTV-664 | A 4 | 1 | 20 | Perchloroethylene | 5.5 |
| RTV-664 | B 2 | 5 | 10 | Isopropylether | 3.2 |
| RTV-664 | C 2 | 5 | 10 | " | 2.5 |

The actual activating primers and bridging agents used are the following:

Bridging Agents

1. γ-Aminopropyltriethoxy silane
2. γ-Mercaptopropyltriethoxy silane
3. Vinyl-tris (β-methoxy ethoxy) silane
4. γ-Methacryloxypropyltrimethoxy silane
5. γ-(3,4-epoxycyclohexayl) ethyltrimethoxy silane
6. γ-Glycidoxypropyltrimethoxy silane
7. Diethyleneglycol
8. Monoethanolamine
9. Tetraethoxyethylene diamine

-continued

| | Bridging Agents |
|---|---|
| 10. | γ-isocyanate propyltriethoxy silane |

| | Activating Primers |
|---|---|
| A. | Benzyltrimethylammonium Hydroxide |
| B. | Potassium isopropylate |
| C. | Sodium dimethyl siliconate |

The lack of effectiveness of the vinyl and carboxyl groups as bridging agents is apparent.

While specific examples of the present invention have been shown and described above, many variations are possible. For example, the thickness of the polyorganosiloxane layer to be bonded by the bonding procedure of this invention can vary greatly from fractions of an inch to several inches or more. In molds such as mold 10, the silicone rubber body is preferably as thin as possible and may be from 1/16 inch up to 1¾ inches although thicknesses of from 1/16 to ¼ inch are preferred to give the mold release properties desired while minimizing the amount of silicone rubber used. The first and/or second backer can have any desired thickness depending on the intended use of the composite and the properties desired. While the preferred embodiment illustrated utilizes a backer layer 15 of a rubbery material, in some cases molds having rigid backer layers are desired as for example backer layers formed of epoxies or other of the polymeric materials described herein. While the backer of the layer 15 is described as a polymeric material other than a polyorganosiloxane, it may contain a small amount of siloxane groups. Preferably the backer material is primarily of a different organic polymeric material than organopolysiloxanes although it may contain preferably no more than 30% by weight of siloxane groups as part of a copolymeric backer material. Thus the backer is an essentially non-silicone polymer. Where the layer 15 is used as an adhesive layer to bond to a second backer which can be cured, preformed organic polymeric materials, metals, ceramics, glass or the like, such second backer is used to impart desired backing properties such as rigidity, mechanical reinforcement, and enhanced tensile strength, prolonged elastomeric properties. For example if the layer 15 is an epoxy a polymerized preformed polyurethane sheet can be bonded to the cured silicone surface by applying such sheet to the layer 15 during its curing process.

While the method of this invention has been described primarily for use in forming composite silicone rubber molds, any previously cured polyorganosiloxane can be treated to bond it in the manner of this invention.

What is claimed is:

1. A method of bonding a cured silicone rubber to an essentially non-silicone, organic polymeric substance comprising applying a composition consisting essentially of an alkaline activating agent selected from the group consisting essentially of γ-aminopropyltrimethoxy silane, γ-aminopropyltriethoxy silane, and N-β-(aminoethyl)-γ-aminopropyltrimethoxy silane, to a surface of the silicone rubber which activating agent functions to disrupt siloxane groups in said silicone rubber, and said activating agent also acts as a bridging agent which bridging agent bonds with said so disrupted siloxane groups and leaves a residue reactive group,
said polymeric substance being a polyurethane,
and reacting said residue reactive group to form a bond with said polyurethane, said bond having adhesion of over 0.1 lb/in.

2. A method of bonding a cured polyorganosiloxane to an essentially non-silicone, organic polymeric substance comprising, applying an activating agent other than a peroxide material to a surface of the polyorganosiloxane which activating agent functions to disrupt siloxane groups in said polyorganosiloxane, and applying a bridging agent to said surface which bridging agent bonds with said so disrupted siloxane groups and leaves a residue reactive group,
reacting said residue reactive group to form a bond with said polymeric substance, said bond having adhesion of over 0.1 lb/in.,
said polyorganosiloxane being a silicone rubber and said polymeric substance being a polyurethane, and said polyurethane being cured during said last-mentioned reacting step, with said activating agent being selected from the group consisting essentially of calcium hydroxide, sodium hydroxide, potassium hydroxide, cesium hydroxide, alkali metal silanolates, alkali metal alkoxides, quaternary ammonium hydroxides, quaternary phosphonium hydroxides, potassium amide, silanolates and alkoxides of quaternary ammonium and phosphonium radicals, and said bridging agent being an amino organo silane.

3. A method in accordance with the method of claim 2 wherein said activating agent is benzyltrimethylammonium hydroxide.

4. A method in accordance with the method of claim 1 and further comprising the steps of first forming said polyorganosiloxane over a configuration so that a polyorganosiloxane layer results defining a mold cavity and a surface to be bonded to said polymeric substance.

5. A method in accordance with claim 2 wherein said alkali metal silanolate is potassium dimethylsiliconate, said alkali metal alkoxide is potassium isopropylate, said ammonium hydroxide is tetramethylammoniumhydroxide and said phosphoniumhydroxide is tetro-n-butyl-phosphoniumhydroxide.

* * * * *